Aug. 17, 1965 H. J. M. JOORMANN ETAL 3,201,632
ELECTROLUMINESCENT ELEMENT EMPLOYING A CHROME
IRON BASE PLATE WITH MATCHING GLASS ENAMELS
Filed Feb. 1, 1961

INVENTORS
HENDRIK J.M. JOORMANN
GESINUS DIEMER
HENDRIK A. KLASENS
BY WILLEM WESTERVELD
Frank R. [signature]
AGENT United States Patent Office 3,201,632

Patented Aug. 17, 1965

3,201,632

ELECTROLUMINESCENT ELEMENT EMPLOYING A CHROME IRON BASE PLATE WITH MATCHING GLASS ENAMELS

Hendrik Jacobus Maria Joormann, Gesinus Diemer, Hendrik Anne Klasens, and Willem Westerveld, all of Emmasingel, Eindhoven, Netherlands, assignors to North American Philips Company, Inc., New York, N.Y., a corporation of Delaware Filed Feb. 1, 1961, Ser. No. 86,534

Claims priority, application Netherlands, Feb. 4, 1960, 248,089

14 Claims. (Cl. 313—108)

Figure 1:
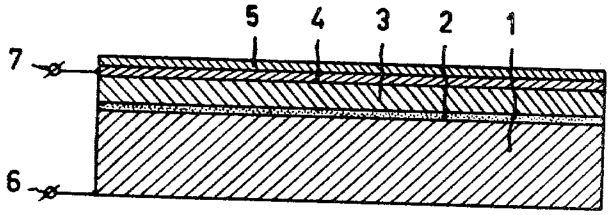

This invention relates to electroluminescent elements comprising a metal carrier and a glass-enamel layer in which the electroluminescent material is embedded and which is covered with a conductive layer on each side, the conductive layer on the side remote from the carrier being permeable to the radiation emitted by the electroluminescent layer upon applying a voltage between the two conductive layers. The conductive layer adjacent the carrier and the carrier may be united. The term "conductive layer" is to be understood herein to mean an electrode galvanically led to the exterior and provided with a terminal. The electroluminescent materials used are for instance, activated zinc sulphides and zinc-sulphides-selenides.

It is known to use metal plates of iron, copper and nickel-plated or copper-plated iron as substrata for electroluminescent elements in which the electroluminescent material is embedded in glass enamel. The use of plates of pure iron or pure copper on which the electroluminescent layer is provided directly affords the advantages of a cheap carrier material. However, disadvantages then involved are the poor adhesion to iron or copper of glass enamels which are readily fusible and endured by zinc sulphides, the poor light output of the element and the low breakdown voltage. It has been found that nickel-plating and copper-plating of iron is not sufficient to meet these disadvantages. The drawbacks may be suppressed in part by using a heavily-enamelled iron carrier, but this gives rise to a structure which is more expensive and more complicated. An element according to the invention provides a solution in which these disadvantages are avoided.

According to the invention, the metal carrier consists of chrome-iron. This is known in engineering under the name "chrome steel," which has a composition of about 10% to 35% of chrome and 90% to 65% of iron. Chrome-iron has a coefficient of expansion such that a favourable pigmented glass enamel layer having electroluminescent properties can be manufactured which, as regards its coefficient of expansion, is properly matched to that of chrome-iron so that after the adhesion of the glass enamel to the chrome-iron no heavy mechanical stresses occur in the electroluminescent layer, which would result in a poor light output, possibly due to fissures which decrease the breakdown voltage of the electroluminescent layer. The glass enamel satisfactorily adheres to the chrome-iron carrier, since the chrome during enamelling gives rise to a transition layer of chrome-oxide which enhances the adhesion. An element according to the invention can also resist a high breakdown voltage, even in cases where the metal carrier has not first been enamelled. Particularly good results are obtained with a chrome-iron alloy consisting of 25% of chrome and 75% of iron.

Many of the favourable effects may also be obtained by using as a material for the carrier iron or an iron alloy treated so that a surface layer rich in chrome has formed, for example by the so-called inchromating process.

Since for a given operating voltage, for example, the line voltage, the light output decreases upon increasing thickness of the glass enamel layer, this thickness is not chosen greater than necessary and is preferably from 20 to 80 microns. More particularly the glass enamel layer is built up of a partial layer adjacent the metal carrier and containing titanium-dioxide pigment and a partial layer remote from the metal carrier and containing the electroluminescent material. Such a structure affords the advantages that the light output is higher than that of a device having a glass enamel layer which has the same thickness, but which contains electroluminescent material only. In addition, there is a smaller possibility of the electroluminescent material being chemically attacked by the metal carrier, while the light emitted by the electroluminescent material is reflected by the partial layer containing the titanium-dioxide pigment. In contrast to known analogous layers which contain organic binders instead of glass enamel, the resistivity to breakdown in the structure according to the invention has been found to be the same in either case. Preference is given to a partial layer containing titanium-dioxide pigment which has a thickness of from 5 to 50 microns and a content of titanium-dioxide pigment of from 5% to 20% by volume. The partial layer containing electroluminescent material is preferably from 15 to 50 microns thick and has a content of electroluminescent material of from 20% to 50% by volume.

As regards the glass enamel in which the electroluminescent material is embedded, those enamels are preferred which are little reactive with respect to the chrome-iron carrier, since otherwise due to diffusion of chrome through the glass enamel the light output would decline as a result of the disadvantageous influence of chrome upon the electroluminescent material. Such attack takes place if the enamel contains many alkaline oxides relative to the acid oxides and hence in the case of alkaline enamels. Consequently, for chrome-iron carriers use is preferably made of glass enamels having a low alkalinity. The alkalinity of a glass may be determined, for example, in the following manner. A glass powder (so-called frit) is manufactured by pouring molten enamel into water whereby it is burst into many pieces. The acidity of the water is then a measure of that of the glass enamel. A glass enamel of low alkalinity has, for example, a composition of

| | Mol. percent |
|---|---|
| $LiO_2$ | 5 |
| $Na_2O$ | 10 |
| CaO | 0.6 |
| SrO | 4.5 |
| ZnO | 14.5 |
| $TiO_2$ | 3.5 |
| $Al_2O_3$ | 3.5 |
| $SiO_2$ | 23.0 |
| $B_2O_3$ | 30.0 |

As previously mentioned, the glass enamel satisfactorily adheres to the chrome-iron carrier, since the chrome gives rise to a transition layer of chrome-oxide which enhances the adhesion. Such oxidation occurs either before or during the forming of the enamel layer, after the chrome-iron carrier has been heated in air for some time for the purpose of cleaning. The oxidation which thus occurs may be small, but the thickness of the oxide layer still cannot be neglected, since with undue thickness the light output of the element might be detrimentally affected, probably due to diffusion of the oxides to the grains of the electroluminescent material. Consequently, an element is preferred in which the oxide layer between the chrome-iron carrier and the glass enamel layer has a thickness less than 1 micron. Such a layer may be obtained by removing the fat from the chrome-iron carrier, prior to enamelling, in a bath at room temperature and rapidly heating to the enamelling temperature after the enamel pigment suspension has been provided.

In manufacturing the chrome-iron carrier, the desired thickness may be obtained by rolling. The homogeneity of the surface layer might be disturbed during this rolling treatment, resulting in stresses occurring. This gives rise to a difference in reactivity for oxygen upon heating during providing the enamel layer, resulting in oxide layers of different thicknesses and different colours. Due to the different behaviour in the absorption of the relevant light, stripes may be seen during the use of an electroluminescent element on this basis. The occurrence of stripes with the rolling pattern may be prevented by using a chrome-iron carrier covered with a layer of a hydrolized silicic-acid ester, for example of hydrolized ethyl-silicate. The metal is shielded by such a layer and the oxide layer is so thin that any appreciable differences in colour do not occur. In addition, the layer affords the advantage that it is active both at very high temperatures and at very low temperatures. Its thickness is preferably chosen so that, on the one hand, interference patterns with visible light do not occur and, on the other hand, satisfactory adhesion to the carrier is obtained. The layer in this case has a thickness between 400 A. and 10,000 A.

Figure 2:
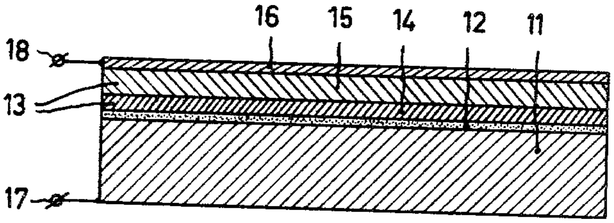
Figure 3:
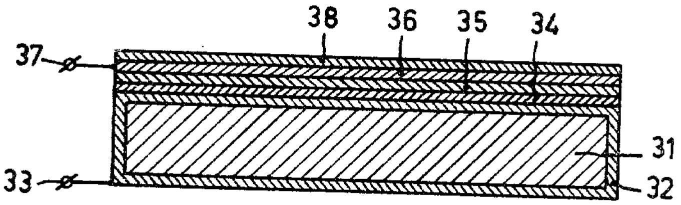

In order that the invention may be readily carried into effect, it will now be described in detail, by way of example, with reference to the accompanying diagrammatic drawing, in which FIGURES 1, 2 and 3 are cross-sectional views of eletroluminescent elements in which the mutual thicknesses of the layers are not shown to scale.

FIGURE 1 shows a cross-section of an electroluminescent element according to the invention comprising a chrome-iron carrier 1 which is covered with an oxide film 2 produced during cleaning and enamelling the carrier. Provided on the carrier 1 is a layer 3 of electroluminescent zinc-sulphide embedded in glass enamel, which has been activated, for example, with copper, silver, gold or manganese and co-activated with aluminium or chlorine. On the side remote from the carrier 1, the layer 3 is covered with a conductive transparent layer 4 of tin-oxide which is covered for protection with a glass layer 5. The carrier 1 and the conductive transparent layer 4 are provided with connecting terminals 6 and 7 respectively.

FIGURE 2 also shows a cross-section of an electroluminescent element according to the invention, comprising a chrome-iron carrier 11 which is covered with an oxide film 12 produced during cleaning and enamelling the carrier. Provided on the carrier 11 is a glass enamel layer 13 built up of two partial layers, that is to say a partial layer 14 adjacent the carrier and containing titanium-dioxide pigment and a partial layer remote from the carrier and containing electroluminescent zinc-sulphide. The layer 13 is covered with a conductive transparent layer 16 of tin-oxide. The carrier 11 and the conductive transparent layer 16 are provided with connecting terminals 17 and 18 respectively.

In a certain structure of an element as shown in FIG. 2, the chrome-iron carrier 11 has a thickness of 0.2 mm. and a composition of 25% of chrome and 75% of iron. The partial layer 14 has a thickness of 15 microns and a content of titanium-dioxide pigment of 10% by volume. The partial layer 15, which contains 30% by volume of activated zinc-sulphide, has a thickness of 25 microns. The oxide film 12, present on the chrome-iron carrier 11, has a thickness of 0.5 micron. Such a thin layer is obtained by removing the fat from the carrier 1, before providing the enamel layer, in a bath of tetra at room temperature. After the enamel pigment suspension has been provided, the organic constituents are removed from the said layer by heating to 450° C. After cooling, the carrier is immediately introduced into the oven, which is at 700° C., and kept therein for 3 to 5 minutes.

For a voltage of 200 volts and 120 cycles/sec., the light output is 45 lumen/sq. metre. For comparison it is mentioned that the light output is 25 lumen/sq. metre for a similar element having a glass carrier instead of the chrome-iron carrier.

FIGURE 3 also shows a cross-section of an electroluminescent element according to the invention, comprising a chrome-iron carrier 31 of 0.3 mm. thickness, which is surrounded on all sides by a hydrolized ethyl-silicate layer 32 of 0.8 micron thickness, on which a connecting terminal 33 is provided. On this layer are successively a glass enamel layer 34 of 45 microns thickness, which contains 10% by volume of titanium-dioxide pigment, a glass enamel layer 35 of 25 microns thickness, which contains 35% by volume of activated zinc-sulphide, a transparent conductive layer 36 of 0.3 micron thickness, which consists of tin-oxide activated in a suitable manner and is provided with a terminal 37, and a transparent enamel layer 38 of 50 microns thickness. The layer of hydrolized ethyl-silicate is provided on the chrome-iron carrier in the following manner. A sol is manufactured having the composition 6.2% by weight of ethyl-silicate, 1.2% by weight of methanol, 3.4% by weight of water and 89.1% by weight of isobutanol. 1 part by volume of this sol is diluted with 19 parts by volume of isobutanol, followed by dipping into it the chrome-iron plate.

What is claimed is:

1. An electroluminescent element comprising a metal carrier and a glass enamel layer in which the electroluminescent material is embedded and which is covered with a conductive layer on each side, the conductive layer on the side remote from the carrier being permeable to the radiation emitted by the electroluminescent layer upon applying a voltage between the two conductive layers, characterized in that the metal carrier consists of chrome-iron.

2. The electroluminescent element of claim 1, wherein the metal carrier is at the same time a conductive layer.

3. The electroluminescent element of claim 1, wherein the metal carrier consists of 25% of chrome and 75% of iron.

4. The electroluminescent element of claim 1, wherein the glass enamel layer has a thickness of from 20 to 80 microns.

5. The electroluminescent element of claim 4, wherein the glass enamel layer is built up of a partial layer adjacent the metal carrier and containing titanium-dioxide pigment and a partial layer remote from the metal carrier and containing the electroluminescent material.

6. The electroluminescent element of claim 5, wherein the partial layer containing the titanium-dioxide pigment has a thickness of from 5 to 50 microns.

7. The electroluminescent element of claim 6, wherein the content of titanium-dioxide pigment in the relevant partial layer is from 5% to 20% by volume.

8. The electroluminescent element of claim 5, wherein the partial layer containing the electroluminescent material has a thickness of from 15 to 50 microns.

9. The electroluminescent element of claim 8, wherein the content of electroluminescent material in the relevant partial layer is from 20% to 50% by volume.

10. The electroluminescent element of claim 1, wherein the glass enamel is low alkaline.

11. The electroluminescent element of claim 10, wherein the glass enamel has a composition of

| | Mol. percent |
|---|---|
| $Li_2O_2$ | 5 |
| $Na_2O$ | 10 |
| CaO | 6 |
| SrO | 4.5 |
| ZnO | 14.5 |
| $TiO_2$ | 3.5 |

| | |
|---|---|
| $Al_2O_3$ | 3.5 |
| $SiO_2$ | 23.0 |
| $B_2O_3$ | 30.0 |

12. The electroluminescent element of claim 1, wherein the oxide layer between the chrome-iron carrier and the glass enamel layer has a thickness less than 1 micron.

13. The electroluminescent element of claim 1, wherein the chrome-iron carrier is entirely covered with a layer of a hydrolyzed silicic-acid ester.

14. The electroluminescent element of claim 13, wherein the layer of the hydrolyzed silicic-acid ester has a thickness of from 400 A. to 10,000 A.

References Cited by the Examiner

UNITED STATES PATENTS

| | | |
|---|---|---|
| 2,866,117 | 12/58 | Walker et al. |
| 2,911,553 | 11/59 | Joorman. |

6

| | | |
|---|---|---|
| 2,922,912 | 1/60 | Miller. |
| 3,061,467 | 10/62 | Vincent. |
| 3,101,277 | 8/63 | Eder et al. |

FOREIGN PATENTS

| | | |
|---|---|---|
| 733,260 | 7/55 | Great Britain. |

OTHER REFERENCES

"Materials Technology for Electron Tubes," by W. H. Kohl, Reinhold Publishing Corp., 330 W. 42nd Street, New York, N.Y., Chap. 4, "Glass to Metal Seals," pages 52 to 99.

"Problems in Electroluminescent Television Display," by Robt. M. Bowie, Sylvania Technologist, vol. XI, No. 3, July 1958, pages 82 to 85.

GEORGE N. WESTBY, *Primary Examiner.*

RALPH G. NILSON, *Examiner.*